US012763541B2

(12) United States Patent
Thompson et al.

(10) Patent No.: US 12,763,541 B2
(45) Date of Patent: Oct. 13, 2026

(54) COEFFICIENT OF THERMAL EXPANSION MATCHED MOUNTING TECHNIQUE FOR HIGH POWER LASER

(71) Applicant: BAE SYSTEMS Information and Electronic Systems Integration Inc., Nashua, NH (US)

(72) Inventors: David E. Thompson, Nashua, NH (US); Gerard J. Pelletier, Amherst, NH (US); Katherine J. Snell, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 907 days.

(21) Appl. No.: 17/844,393

(22) Filed: Jun. 20, 2022

(65) Prior Publication Data

US 2023/0411921 A1 Dec. 21, 2023

(51) Int. Cl.

*H01S 3/02* (2006.01)
*H01S 3/04* (2006.01)
*H01S 3/06* (2006.01)

(52) U.S. Cl.

CPC ............ *H01S 3/0405* (2013.01); *H01S 3/025* (2013.01); *H01S 3/0606* (2013.01)

(58) Field of Classification Search

CPC ........ H01S 3/0405; H01S 3/042; H01S 3/025; H01S 3/0606; H01S 3/0602; H01S 3/0941

See application file for complete search history.

(56) References Cited

U.S. PATENT DOCUMENTS

| | | | |
|---|---|---|---|
| 4,378,601 A | 3/1983 | Eggleston, III et al. | |
| 4,949,346 A | 8/1990 | Kuper et al. | |
| 5,546,416 A | 8/1996 | Basu | |
| 5,754,575 A | 5/1998 | Sukhman et al. | |
| 6,002,695 A * | 12/1999 | Alfrey | H01S 3/109 372/22 |
| 6,636,538 B1 | 10/2003 | Stephens | |
| 6,822,994 B2 | 11/2004 | Kennedy | |
| 7,170,919 B2 | 1/2007 | Zamel et al. | |
| 9,362,716 B2 | 6/2016 | Swanbeck et al. | |
| 10,965,084 B1 | 3/2021 | Tartaglia et al. | |
| 2006/0039425 A1 * | 2/2006 | Betin | H01S 3/0602 372/39 |
| 2020/0266599 A1 | 8/2020 | Refaat et al. | |

FOREIGN PATENT DOCUMENTS

CN 107516812 A 12/2017

OTHER PUBLICATIONS

CN107516812 (English translation) (Year: 2017).*
International Search Report, PCT/US23/23816, mailed Mar. 25, 2024, 17 pages.

* cited by examiner

*Primary Examiner* — Tod T Van Roy
*Assistant Examiner* — Delma R Forde
(74) *Attorney, Agent, or Firm* — KPIP Law, PLLC; Gary McFaline

(57) ABSTRACT

The system and method for mounting a high power laser having a coefficient of thermal expansion that is thermally matched for the gain medium and the mount. In some cases, the gain medium is clamped by the mount along longitudinal edges and has a pair of free ends not in thermal contact with the mount. A thermal interface may be present along at least a portion of the longitudinal edges.

20 Claims, 7 Drawing Sheets

COEFFICIENT OF THERMAL EXPANSION MATCHED MOUNTING TECHNIQUE FOR HIGH POWER LASER

STATEMENT OF GOVERNMENT INTEREST

This disclosure was made with United States Government support under a classified Contract No. awarded by a classified Agency. The United States Government has certain rights in this disclosure.

FIELD OF THE DISCLOSURE

The present disclosure relates to high power lasers and more particularly to a mounting technique for high power lasers using a matched coefficient of thermal expansion approach.

BACKGROUND OF THE DISCLOSURE

This disclosure describes a means of reducing mount induced distortions in high power, conductively cooled slab lasers. Typically, conductively cooled slabs are pumped on one side with the other side bonded to a heatsink. This creates a one dimensional temperature gradient which causes the slab to bend. In a total internal reflection geometry, this slab bend induces a curvature of the reflecting surfaces resulting in a focusing of the light transmitted through the slab. This focusing reduces the fundamental transverse mode size and increases the number of transverse modes lasing in the cavity which reduces beam quality. This one dimensional temperature gradient can also create beam deviation which results in cavity misalignment and/or pointing changes of the output beam. Furthermore, this one dimensional cooling geometry results in high stress, which induces birefringence in the slab medium which depolarizes the light in the cavity, resulting in optical loss in systems requiring a polarized output.

Wherefore it is an object of the present disclosure to overcome the above-mentioned shortcomings and drawbacks associated with conventional mounting techniques used for high power lasers.

SUMMARY OF THE DISCLOSURE

One aspect of the present disclosure is a mount for a slab laser. The mount also includes a first half of the mount and a second half of the mount, where each half is securable to a heat sink via a plurality of heat sink fasteners. The mount also includes the first half of the mount and the second half of the mount being configured to accommodate a gain medium having a length and a first end and a second end, the gain medium being configured to be pumped from above. The mount also includes the first end of the gain medium and the second end of the gain medium being free ends and not in thermal contact with the first half or the second half of the mount so that the free ends do not induce thermal lensing or create displacement issues. The mount also includes where thermal transfer occurs along a pair of edges of the gain medium coincident with the length of the gain medium, each half of the mount securing the gain medium via gain clamping fasteners and making thermal contact along the pair of edges to maintain the gain medium with a uniform temperature along its length.

Implementations may include one or more of the following features. The mount may include a thermal interface sandwiched between the gain medium and at least a portion of a length of the pair of edges. Thermal monitoring is possible via temperature sensors. The gain medium is a crystal. The mount may include coefficient of thermal expansion (CTE) material that is matched to that of the gain medium and the material of the heat sink to which is the mount is mounted. The mount dissipates about 100 w of heat.

Another general aspect includes a mount for a slab laser. The mount also includes a first half of the mount and a second half of the mount, where each half is securable to a heat sink via a plurality of heat sink fasteners. The mount also includes the first half of the mount and the second half of the mount being configured to accommodate a gain medium having a length and a first end and a second end. The mount also includes the first end of the gain medium and the second end of the gain medium being free ends and not in thermal contact with the first half or the second half of the mount so that free ends do not induce thermal lensing or create displacement issues. The mount also includes where thermal transfer occurs along a pair of edges of the gain medium coincident with the length of the gain medium, each half of the mount securing the gain medium via gain clamping fasteners and making thermal contact along the pair of edges to maintain the gain medium with a uniform temperature along its length.

Implementations may include one or more of the following features. The mount may include a thermal interface sandwiched between the gain medium and at least a portion of a length of the pair of edges. The gain medium is pumped from above, below, or a side. The gain medium is pumped from above. Thermal monitoring is possible via temperature sensors. The gain medium is a crystal. The mount may include coefficient of thermal expansion (CTE) material that is matched to that of the gain medium and the material of the heat sink to which is the mount is mounted. The mount dissipates about 100 w of heat.

Yet another general aspect includes a method of manufacturing a cooling mount for a laser providing a mount, may include: a first half of the mount and a second half of the mount, where each half is securable to a heat sink via a plurality of heat sink fasteners; the first half of the mount and the second half of the mount being configured to accommodate a gain medium having a length and a first end and a second end; and the first end of the gain medium and the second end of the gain medium being free ends and not in thermal contact with the first half or the second half of the mount, the free ends do not induce thermal lensing or create displacement issues; where thermal transfer occurs along a pair of edges of the gain medium coincident with the length of the gain medium. The method also includes securing the gain medium between the first half and the second half of the mount via gain clamping fasteners. The method also includes making thermal contact along the pair of edges of the gain medium with the first half and the second half of the mount to maintain the gain medium with a uniform temperature along its length; and minimizing thermal lensing when lasing at operating power by pre-pumping the gain medium at a power lower than operating power between operation to pre-heat the gain medium.

Implementations may include one or more of the following features. The method may include providing a thermal interface sandwiched between the gain medium and at least a portion of a length of pair of edges. The method may include providing thermal monitoring via temperature sensors. The method may include matching a coefficient of thermal expansion (CTE) material of the mount to that of the gain medium and the material of the heat sink to which the mount is mounted. The method may include dissipating about 100 w of heat via the mount.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular implementations of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
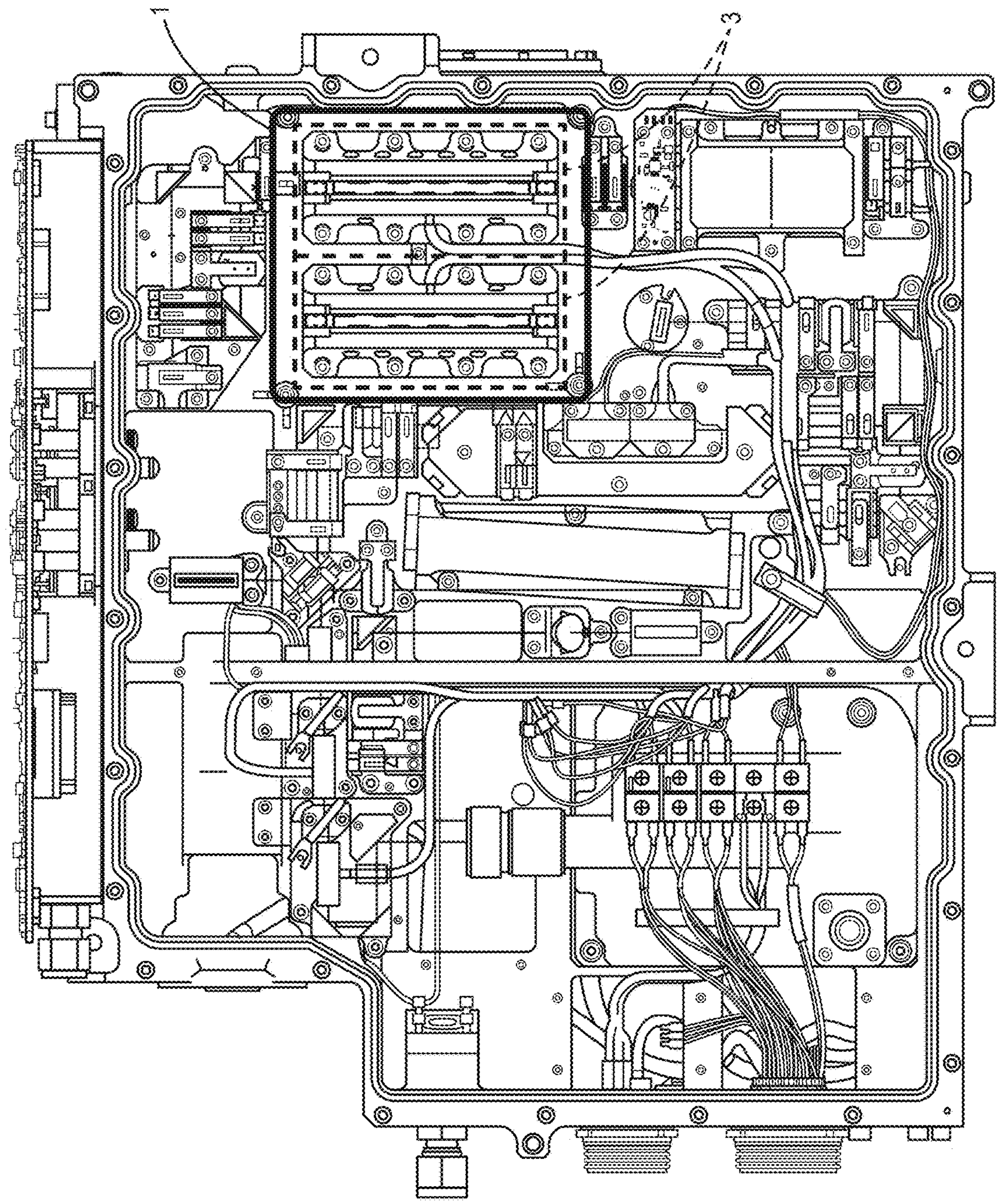
FIG. 1 is an illustration of one implementation of the system of the present disclosure.

Disclosed herein are systems and methods for controlling and minimizing optical distortions of conductively cooled slab lasers. The system includes a heat sink 11 for a slab laser, a gain medium 10, a mount 3, a thermal interface 16 disposed between the gain medium and the mount, and a series of gain clamping fasteners 7 arranged on the mount such that the clamping force induced by the fasteners on the gain medium is equally distributed. As disclosed herein, the system provides advantages that include, at least, reduced optical distortion, improved efficiency, and improved heat dissipation.

The gain medium is typically referred to as a slab. The slab is typically a laser crystal gain medium and may include, as non-limiting examples, Nd:YAG (neodymium-doped yttrium aluminum garnet (Nd:YAG), ytterbium-doped YAG (Yb:YAG), Yb:glass, erbium-doped YAG (Er:YAG), Ti:sapphire, Alexandrite, or Yb:XTAL. A skilled practitioner, however, will recognize that the invention supports any other type of gain medium. The slab is typically constructed such that the length of the slab is greater than the width of the slab. The slab may further be defined by a longitudinal axis along the length of the slab wherein first and second edges are disposed opposite to each other and along the longitudinal axis. The slab functions as a conductive path and amplifier of laser radiation. The initial source of laser radiation is typically directed along the longitudinal axis of the slab ("edge pumping") or perpendicular to the longitudinal axis of the slab ("face pumping"). Less common pumping approaches include zig-zag pumping wherein the geometry of the slab is configured such that laser radiation is repeatedly reflected by the adjoining structure (typically a highly polished frame) as it travels the length of the slab. A skilled practitioner will recognize that the present disclosure provides advantages for all pumping varieties.

Laser radiation along the slab is amplified by the slab material. However, inefficiencies exist such that some laser radiation is dissipated in the form of heat. The resulting heat causes a temperature increase in the material which can cause optical distortions such as thermal lensing, thermal wedging, and birefringence. Further, heat transfer from the slab material to the surrounding structure, the mount, results in mechanical/thermal expansion that may impose stress on the slab material.

Figure 2:
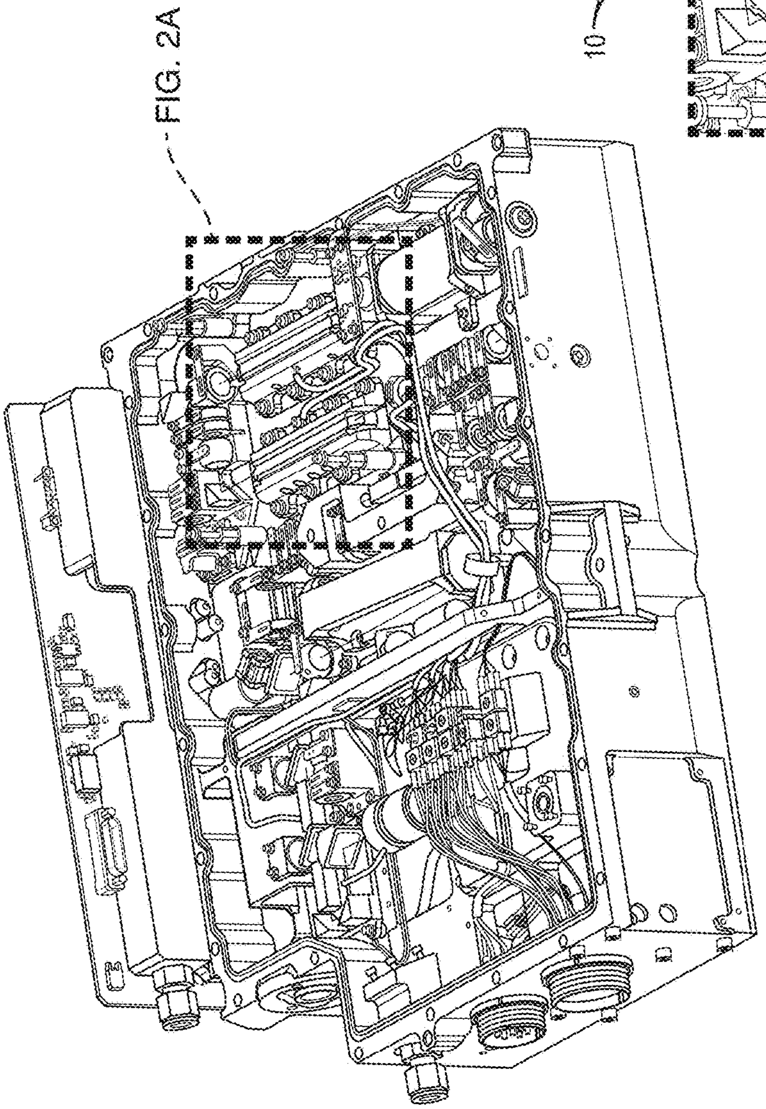
FIG. 2 is a perspective view of the implementation of the system of the present disclosure shown in FIG. 1.
Figure 2A:
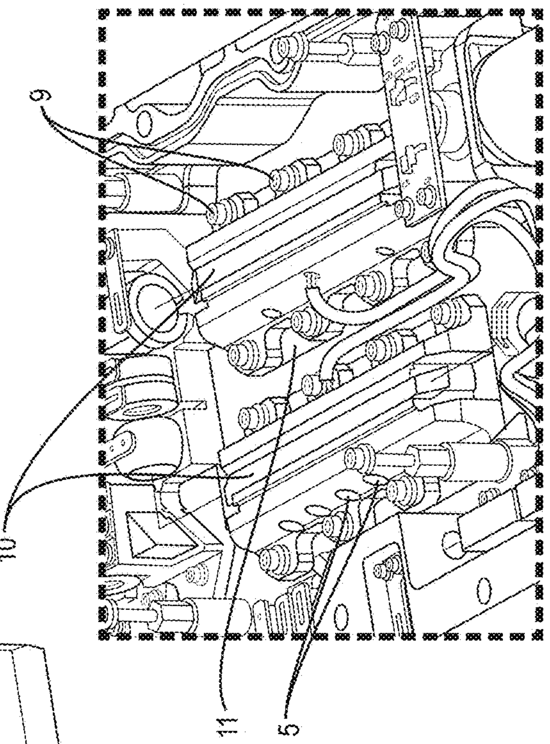
FIG. 2A is an enlarged view of the implementation of the coefficient of thermal expansion matched mounting technique for high power laser shown in FIG. 1.

FIG. 1 is an illustration of one implementation of the system of the present disclosure. In this implementation, the coefficient of thermal expansion matched mounting technique for a high power laser 1 comprises a pair of mounts 3. In FIG. 2 a perspective view of the implementation in FIG. 1 is shown. FIG. 2A is an enlarged view of the implementation of the coefficient of thermal expansion matched mounting technique for high power laser shown in FIG. 1. More specifically, each mount 3 is comprised of first half 2 and second half 4. A plurality of gain fastener openings 5 are arranged on each second half 4 of the mount 3. Although six gain fastener openings 5 are shown, it is understood that the number of gain fastener openings and gain clamping fasteners will vary by application. This mechanism will be described in more detail in reference to FIG. 5. Additional heat sink fasteners 9 are arranged on each of the first half 2 and second half 4 of the mount 3 where the mount 3 is in thermal contact with a heat sink 11. Each mount holds a gain medium 10 in position.

One implementation of the present disclosure uses a coefficient of thermal expansion (CTE) matched material in a unique configuration as a high-power laser mount. Here, high average power refers to pump average powers of greater than 100 W. In one implementation, the mount is constructed such that the gain medium (e.g., a crystal) is constrained on the sides and optically pumped from the top, see FIG. 3. In some cases, this minimizes the heat dissipation path length. In one implementation, the free ends 14*a*, 14*b* of the gain medium are not pumped to help reduce thermally induced optical distortions in the tip region.

In one implementation of the coefficient of thermal expansion matched mounting technique for a high power laser, the mount is comprised of two halves and has contiguous material from a side of the slab (gain medium) to a heat sink surface. In certain implementations, the mount halves are spring load fastened to clamp the slab (e.g., crystal) with uniform force. In some cases, the mount is then mounted to a heat sink with screws and spring washers, or the like.

In certain implementations, the slab, or crystal gain medium, is pre-pumped at an average power that is lower than that of operating power between periods of operation to pre-heat the slab to minimize the change in thermal lensing when the gain medium is later pumped at full (operating) power. In one implementation, total power consumption of the system is thus kept low as compared to conventional devices, but since the power needs to be turned on and off rapidly, the laser thermal lens must be stabilized. To do this, pumping is done at a power level less than that of operating power while the thermal lens is maintained at a point within a stability zone of the cavity so the system can be quickly increased to full (operating) power. In some cases, the stability zone is described as where lensing does not cause a pointing error that causes the energy to “walk-off” the optimized beam path.

In some cases, waste heat is channeled from the laser without creating optical distortion (e.g., warping of the slab or thermal lensing). In some cases, the system provides for higher heat density and better optical quality by managing the thermal path as efficiently as possible. In certain implementations, two sided cooling results in lower peak temperature (e.g., by a factor of two by doubling the heat transfer area). The lower peak temperature results in reduced thermal gradients and the resulting lensing and stress-induced birefringence.

Figure 3:
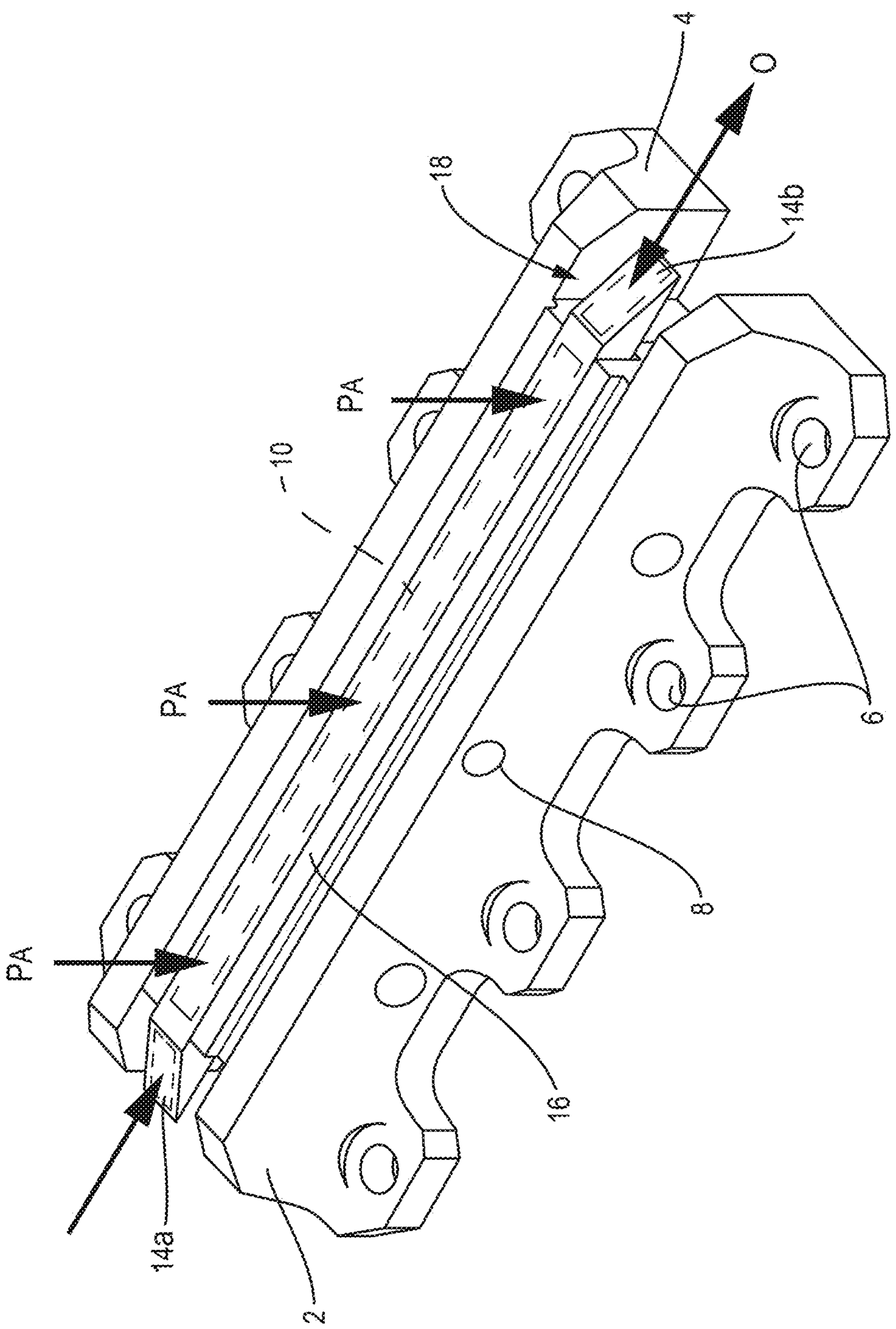
FIG. 3 is a perspective view of one implementation of a coefficient of thermal expansion matched mounting technique for a high-power laser according to the principles of the present disclosure.

Referring to FIG. 3, a perspective view of one implementation of a coefficient of thermal expansion matched mounting technique for a high-power laser according to the principles of the present disclosure is shown. More specifically, this figure represents one unit of a system in which there may be multiple units within the laser system. For example, in one implementation of the high-power laser there are two mounts for two crystals. Each mount has a first half 2 and a second half 4. Each of the halves of the mount are securable to a heatsink (not shown in this figure) using screw and spring washers or the like via heat sink mounting openings 6. In some cases, thermal monitoring is possible via temperature sensors 8. If the temperature of the system is too high, it indicates that the optical conversion efficiency has decreased, which induces more heat. In one implementation, the gain medium (e.g., a coated crystal slab) 10 is pumped from above $P_A$. In one implementation, the laser material is Nd:YAG and the slab dimensions are 4×4×80 mm. However, the approach of the present discourse can apply to any solid-state laser crystal or size. Pumping from above is atypical, and is used here as a packaging convenience. This allows for denser packaging of pumps and gain mediums and it also allows for better control of the pump temperatures versus the gain medium temperatures which need to be maintained at different set points. Physically, the slab could be pumped from the top, bottom, or side. In this implementation, there are two in-plane cooling surfaces which are un-pumped.

Still referring to FIG. 3, optical output is out both ends 18 along the longitudinal axis L of the crystal and the medium converts incoming light from the pump into laser output O. In one implementation, the pump light (incoming) is about 150 W average power and the outcoming light experiences a 50% conversion. In one implementation, the incoming light (pump light) is typically from a 2-D laser diode array, but could also be from single laser bars or fiber-coupled laser diodes, or the like. In one example, the pump wavelength for Nd:YAG is about 808 nm, but could also be 885 nm. That said, the pump wavelength is dependent on the type of laser material being used.

In one implementation, a Nd:YAG, which emits at 1064 nm is used. It is pumped with 100-200 us long pulses, but it also applies to CW pumping. Pump pulse energy in one case was 0.4-0.8 J with a repetition rate of about 200-400 Hz. There, the average pump power was 160 W. In some cases, two mounts are used for two crystals to provide the necessary output power for a particular application.

Energy that is not emitted from the ends of the gain medium as laser output is instead, in the form of thermal energy. Thermal management is needed to prevent cracking of the gain medium and thermal lensing if going from one crystal to another crystal. Thermal transfer occurs along the long edge of the slab such that each half of a mount holds a crystal and makes thermal contact along the long edge of the crystal for good heat transfer and to maintain the crystal with a uniform temperature along its length. The CTE material of the mount is matched to the crystal and the CTE material of the mount is matched to the material of the heat sync to which is it mounted. In some cases, the mount is responsible for dissipating about 100 W of heat.

The ends of the crystal are left exposed 14*a*, 14*b* (not in thermal contact with the mount) so that the ends do not induce thermal lensing or create a displacement issues (movement of the tips of the crystal) caused by heating of the crystal. In some cases, the peak power of the system is about 75 to 150 Watts.

Figure 4:
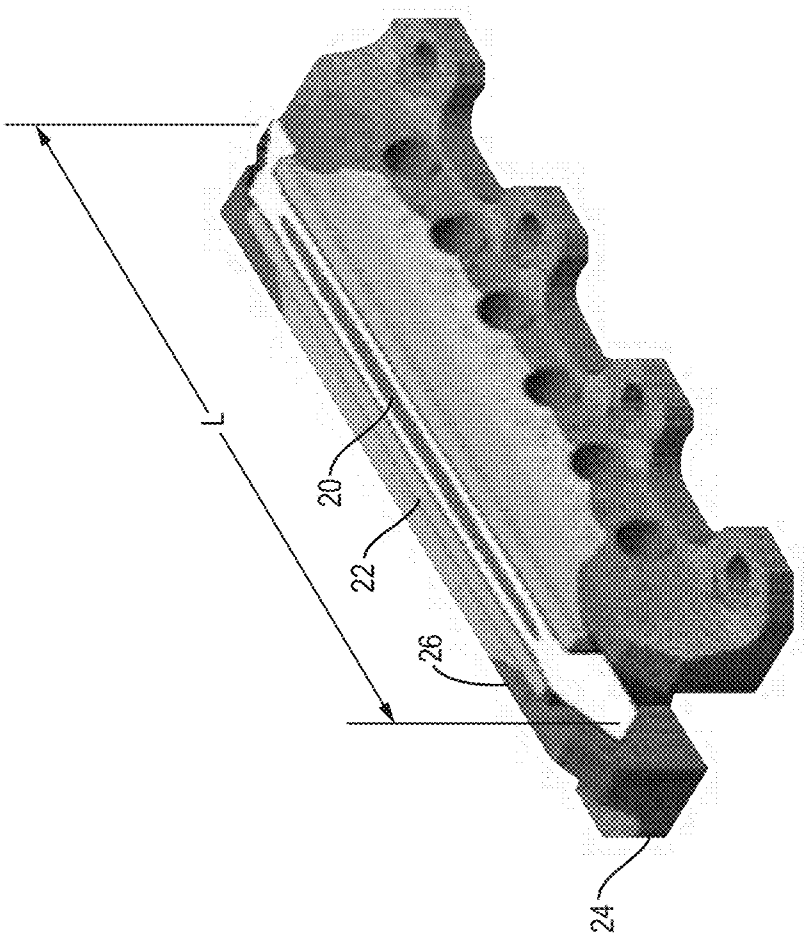
FIG. 4 is a perspective view of thermal analysis of one implementation of a coefficient of thermal expansion matched mounting technique for a high-power laser according to the principles of the present disclosure.

Referring to FIG. 4, a perspective view of thermal analysis of one implementation of a coefficient of thermal expansion matched mounting technique for a high-power laser according to the principles of the present disclosure is shown. More specifically, the hottest region 20 (in red) is shown where the crystal (gain medium) is being pumped in this implementation. The two mount halves 2, 4 are shown as being in thermal contact along the long edges of the slab 22 (light blue) as compared to the area that is in contact with the heat sync 24 (in dark blue). The heat sync is not shown in this figure, but is what the mount is secured to as seen in FIG. 1, for example. The crystal ends 26 (in yellow) are shown having a consistent temperature with that of the length of the slab that are in contact with the mount. The longitudinal axis L of the crystal is also shown.

Figure 5:
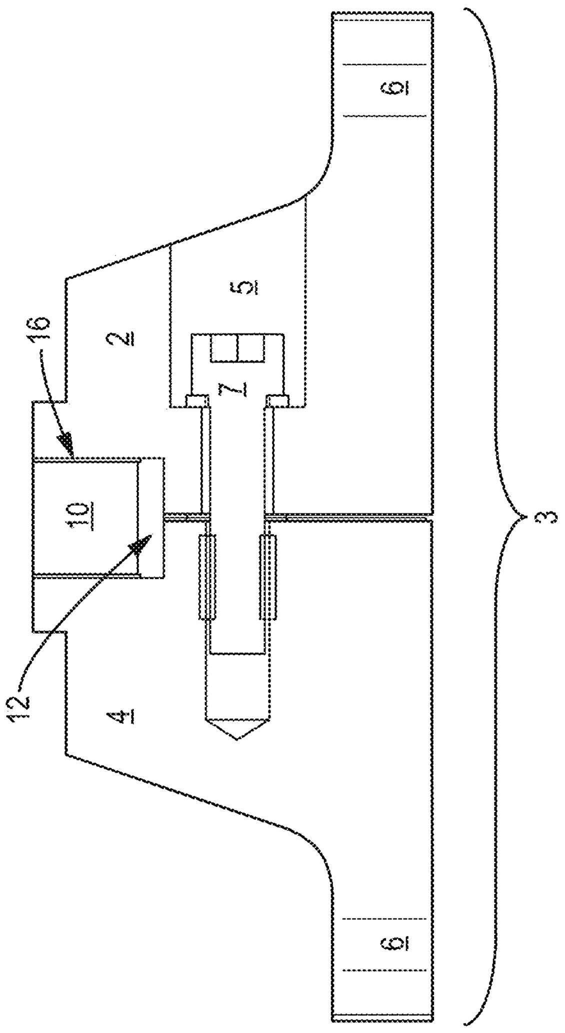
FIG. 5 is an illustration of one implementation of a mount as viewed along the longitudinal axis.

FIG. 5 is an illustration of the mount 3 as viewed along the longitudinal axis of the slab 10. As shown in FIG. 5, gain clamping fasteners 7 (only one depicted) join the first half 2 and the second half 4. In some implementations, the gain clamping fasteners 7 are arranged such that each face the same direction (i.e. from first half 2 into second half 4). In other implementations, the clamping fasteners 7 are arranged in an alternating arrangement such that a first clamping fastener, for example, engages from the first half 2 to the second half 4, a second clamping fastener engages from the second half 4 to the first half 2, and so on. Such an arrangement provides advantages in the form of applying equal clamping force to both first half 2 and second half 4. Belleville washers may further be disposed between the clamping fasteners 7 and first half 2 and second half 4 so as to apply a constant spring force to the halves.

FIG. 5 further illustrates the slab 10 disposed between the first half 2 and the second half 4. A thermal interface 16 is arranged between the slab 10 and the mount half 2, 4. In some implementations, the thermal interface 16 is arranged between every side of the slab 10 adjacent to a surface of the mount 3 and along the full length of the slab 10. In other implementations, the thermal interface 16 may be arranged on a lesser number of adjacent surfaces and may extend only a partial length of the slab 10. In still other implementations, the ends of the slab 14*a*, 14*b*, as defined by the slab 10 surfaces opposite each other along the longitudinal axis, are exposed (i.e. without adjoining mount 3 surfaces) while an area between the slab 10 ends are disposed between first half 2 and second half 4 (in other words, the ends extend beyond the mount). The thermal interface 16 may be comprised of graphite, diamonds, diamond compounds (diamonds mixed with an additional application medium), or other thermal interface material as known in the art. A thermal interface comprising graphite provides advantages due to its compressibility and ability to eliminate air gaps. In some applications, the thermal interface 16 is constructed so as to be 0.005 inches. In certain implementations, there is a gap 12 present below the gain medium so that heat is removed from the sides and the crystal is clamped only on the longitudinal sides of the gain medium. Additional contact area on the gain medium over constrains the system and can effect optical stability.

As an alternative or in addition to the thermal interface 16 the mount 3 may be constructed from materials that are thermally matched to the material of the slab 10. As used herein, the term “thermally matched” means materials having a coefficient of thermal expansion (CTE) that is between 1 to 3 times the CTE of the slab 10, where matched means using materials that have the same, or similar, CTE, such that growth over temperature is uniform and does not induce stresses between the multiple parts/materials. The CTE of a material describes how the size of an object changes with a change in temperature. Specifically, it measures the fractional change in size per degree change in temperature at a constant pressure, such that lower coefficients describe lower propensity for change in size.

Figure 6:
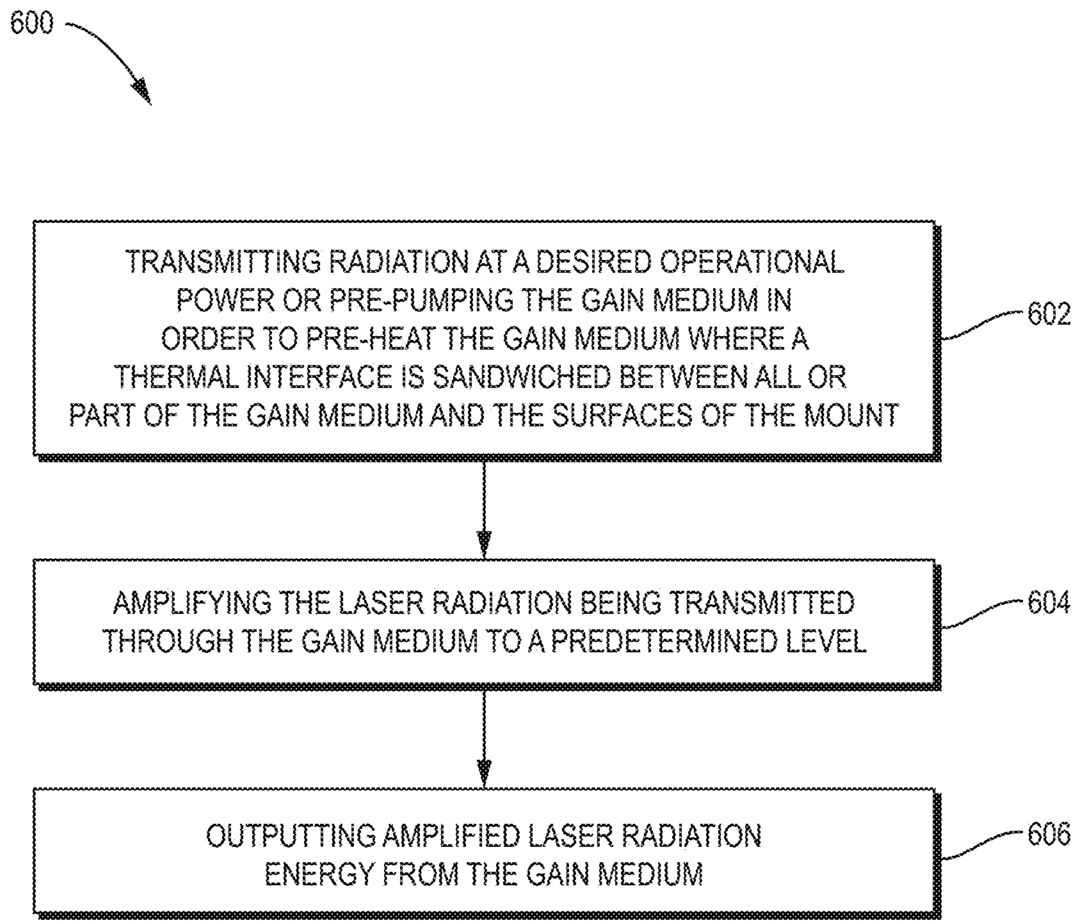
FIG. 6 is a flow diagram illustrating a method of using a thermally matched slab laser according to the principles of the present disclosure.

FIG. 6 is a flow diagram illustrating a method 600 of using a thermally matched slab laser. The method 600 begins at block 602 by causing to transmit laser radiation through a gain medium. The laser radiation may be transmitted at a desired operational power (e.g., 150 W) or the user may choose to pre-pump the gain medium in order to pre-heat the gain medium and minimize the change in thermal lensing when the gain medium is later pumped at full power. As described herein with respect to the method 600, the gain medium may be the same as the gain medium for the previously described system (i.e. slab 10). The laser radiation of block 602 may further be transmitted through the gain medium in an edge pumping or face pumping configuration. The gain medium may be disposed on the mount of the previously described system (i.e. mount 3). The gain medium may further be disposed on the mount such that a thermal interface of the previously described system separates all or part of the gain medium and the surfaces of the mount. At block 604, the laser radiation being transmitted through the gain medium is amplified to a predetermined level. At block 606, the amplified laser radiation energy exits the gain medium.

Figure 7:
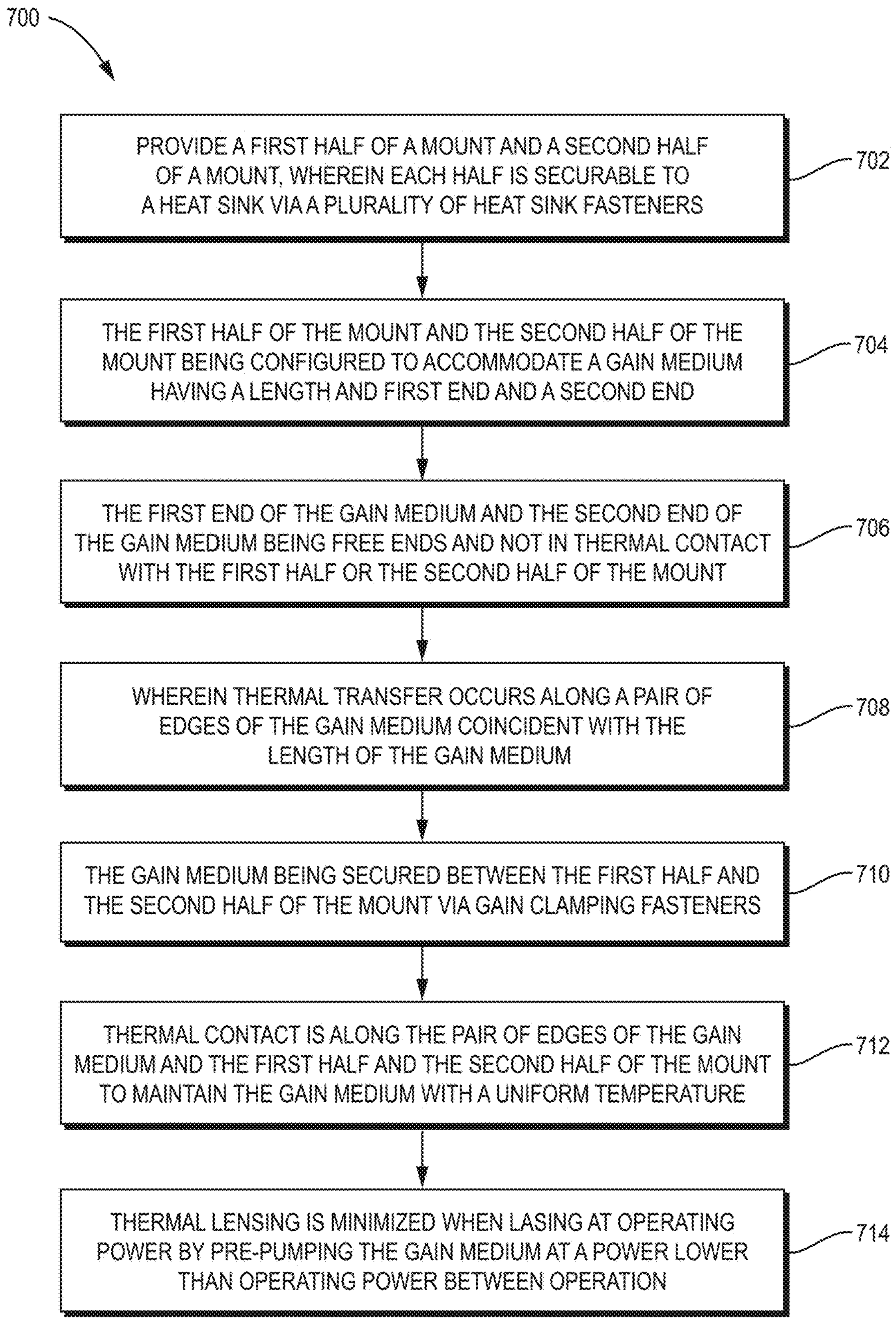
FIG. 7 is a flow diagram illustrating a method for manufacturing a coefficient of thermal expansion matched mount for use with a slab laser according to the principles of the present disclosure.

FIG. 7 is a flow diagram illustrating a method 700 for manufacturing a slab laser where a gain medium is selected. The gain medium may be selected from materials including, as non-limiting examples, Nd:YAG (neodymium-doped yttrium aluminum garnet (Nd:YAG), ytterbium-doped YAG (Yb:YAG), Yb:glass, erbium-doped YAG (Er:YAG), Ti:sapphire, Alexandrite, or Yb:XTAL. The gain medium may be constructed so as to have a wide aspect ratio (i.e. greater length than width) or may be constructed to any dimension necessary for a particular application. At block 702, a first half of a mount and a second half of a mount are provided, wherein each half is securable to a heat sink via a plurality of heat sink fasteners. The mount may be the mount 3 previously described in this disclosure. At block 704, the gain medium is disposed in a mount. At block 706, the first end of the gain medium and the second end of the gain medium have free ends not in thermal contact with the first half or the second half of the mount, the free ends do not induce thermal lensing or create displacement issue. At block 708, thermal transfer occurs along a pair of edges of the gain medium coincident with the length of the gain medium. At block 710, the gain medium is secured between the first half and the second half of the mount via gain clamping fasteners, Making thermal contact along the pair of edges of the gain medium with the first half and the second half of the mount to maintain the gain medium with a uniform temperature along its length at block 712. At block 714, thermal lensing when lasing at operating power is minimized by pre-pumping the gain medium at a power lower than operating power between operation to pre-heat the gain medium. In some cases, a thermal interface 16 is provided along at least a portion of a length of the pair of sides coincident with the longitudinal axis of the gain medium.

While various implementations of the present invention have been described in detail, it is apparent that various modifications and alterations of those implementations will occur to and be readily apparent to those skilled in the art. However, it is to be expressly understood that such modifications and alterations are within the scope and spirit of the present invention, as set forth in the appended claims. Further, the invention(s) described herein is capable of other implementations and of being practiced or of being carried out in various other related ways. In addition, it is to be understood that the phraseology and terminology used herein is for the purpose of description and should not be regarded as limiting. The use of “including,” “comprising,” or “having.” and variations thereof herein, is meant to encompass the items listed thereafter and equivalents thereof as well as additional items while only the terms “consisting of” and “consisting only of” are to be construed in a limitative sense.

The foregoing description of the implementations of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other implementations are contemplated within the scope of the present disclosure in addition to the exemplary implementations shown and described herein. Modifications and substitutions by one of ordinary skill in the art are considered to be within the scope of the present disclosure.

What is claimed:

1. A mount for a slab laser, comprising:

a first half of the mount and a second half of the mount, wherein each half is securable to a heat sink via a plurality of heat sink fasteners;

the first half of the mount and the second half of the mount being configured to accommodate a gain medium having a length and a first end and a second end, the gain medium being configured to be pumped from an upper face of the gain medium, the upper face facing away from the heat sink; and the first end of the gain medium and the second end of the gain medium are a pair of free ends and not in thermal contact with the first half or the second half of the mount so that the pair of free ends do not induce thermal lensing or create displacement issues;

wherein thermal transfer occurs along a pair of edges of the gain medium that are coincident with the length of the gain medium, each half of the mount securing the gain medium via gain clamping fasteners and making thermal contact along the pair of edges to maintain the gain medium with a uniform temperature along its length.

2. The mount according to claim 1, further comprising a thermal interface sandwiched between the gain medium and at least a portion of a length of the pair of edges.

3. The mount according to claim 1, wherein thermal monitoring is possible via temperature sensors.

4. The mount according to claim 1, wherein the gain medium is a crystal.

5. The mount according to claim 1, wherein the mount comprises coefficient of thermal expansion (CTE) material that is thermally matched to that of the gain medium and the material of the heat sink to which is the mount is mounted.

6. The mount according to claim 1, wherein the mount dissipates about 100 W of heat.

7. A mount for a slab laser, comprising:

a first half of the mount and a second half of the mount, wherein each half is securable to a heat sink via a plurality of heat sink fasteners;

the first half of the mount and the second half of the mount being configured to accommodate a gain medium having a length and a first end and a second end, the gain medium being configured to be pumped from an upper face of the gain medium, the upper face facing away from the heat sink; and the first end of the gain medium and the second end of the gain medium are a pair of free ends and not in thermal contact with the first half or the second half of the mount so that the pair of free ends do not induce thermal lensing or create displacement issues;

wherein thermal transfer occurs along a pair of edges of the gain medium that are coincident with the length of the gain medium, each half of the mount securing the gain medium via gain clamping fasteners and making thermal contact along the pair of edges to maintain the gain medium with a uniform temperature along its length; and wherein the gain medium is clamped along the pair of edges, a gap is present below the gain medium, and the upper face and lower face of the gain medium opposite the upper face are free of thermal contact with the first half and the second half of the mount.

8. The mount according to claim 7, further comprising a thermal interface sandwiched between the gain medium and at least a portion of a length of the pair of edges.

9. The mount according to claim 7, wherein the gain medium is pumped from above, below, or a side.

10. The mount according to claim 7, wherein thermal monitoring is possible via temperature sensors.

11. The mount according to claim 7, wherein the gain medium is a crystal.

12. The mount according to claim 7, wherein the mount comprises coefficient of thermal expansion (CTE) material that is thermally matched to that of the gain medium and the material of the heat sink to which is the mount is mounted.

13. The mount according to claim 7, wherein the mount dissipates about 100 W of heat.

14. The mount according to claim 9, wherein the gain medium is pumped from above.

15. A method of manufacturing a cooling mount for a laser, comprising:

providing a mount, comprising:

a first half of the mount and a second half of the mount, wherein each half is securable to a heat sink via a plurality of heat sink fasteners;

the first half of the mount and the second half of the mount being configured to accommodate a gain medium having a length and a first end and a second end, the gain medium being configured to be pumped from an upper face of the gain medium, the upper face facing away from the heat sink; and the first end of the gain medium and the second end of the gain medium are a pair of free ends and not in thermal contact with the first half or the second half of the mount, the pair of free ends do not induce thermal lensing or create displacement issues;

wherein thermal transfer occurs along a pair of edges of the gain medium that is coincident with the length of the gain medium;

securing the gain medium between the first half and the second half of the mount via gain clamping fasteners;

making thermal contact along the pair of edges of the gain medium with the first half and the second half of the mount to maintain the gain medium with a uniform temperature along its length; and minimizing thermal lensing when lasing at operating power by pre-pumping the gain medium at a power lower than operating power between operation to preheat the gain medium.

16. The method according to claim 15, further comprising providing a thermal interface sandwiched between the gain medium and at least a portion of a length of pair of edges.

17. The method according to claim 15, further comprising providing thermal monitoring via temperature sensors.

18. The method according to claim 15, further comprising thermally matching a coefficient of thermal expansion (CTE) material of the mount to that of the gain medium and the material of the heat sink to which the mount is mounted.

19. The method according to claim 15, further comprising dissipating about 100 W of heat via the mount.

20. The method according to claim 15, wherein the mount is configured for pumping the gain medium from above.

* * * * *